United States Patent [19]

Hines et al.

[11] 4,178,860
[45] Dec. 18, 1979

[54] SOIL TREATMENT LIQUID INJECTION DEVICE

[75] Inventors: Charles E. Hines; Dwight E. Williams, both of Lincoln, Nebr.

[73] Assignee: Outboard Marine Corporation, Waukegan, Ill.

[21] Appl. No.: 874,159

[22] Filed: Feb. 1, 1978

[51] Int. Cl.² .................................... A01C 23/02
[52] U.S. Cl. ............................. 111/7; 137/625.11; 172/427; 222/70
[58] Field of Search ............... 111/1, 6, 7, 7.1, 7.2, 111/7.3, 7.4, 77, 85, 34, 89; 172/427; 251/368; 137/624.15, 624.2, 625.11, 625.15, 625.46; 222/70, 620, 614, 615

[56] References Cited

U.S. PATENT DOCUMENTS

| | | | |
|---|---|---|---|
| 2,087,296 | 7/1937 | Parsons | 137/625.11 |
| 3,025,806 | 3/1962 | Peck | 111/6 |
| 3,054,393 | 9/1962 | Schmidt | 137/625.11 X |
| 3,136,274 | 6/1964 | Townsend | 111/6 |
| 3,467,278 | 9/1969 | Williams | 111/1 |
| 3,469,379 | 9/1969 | Hubbard | 137/625.11 X |
| 3,586,109 | 6/1971 | Eversole et al. | 172/747 X |
| 3,614,061 | 10/1971 | Fitzpatrick | 251/368 X |
| 3,636,897 | 1/1972 | Brink | 111/77 |
| 3,926,131 | 12/1975 | Collins | 111/6 |
| 4,034,686 | 7/1977 | Collins | 111/89 X |

FOREIGN PATENT DOCUMENTS

| | | | |
|---|---|---|---|
| 1050108 | 2/1959 | Fed. Rep. of Germany | 111/7.4 |
| 281930 | 4/1971 | U.S.S.R. | 111/6 |

Primary Examiner—Edgar S. Burr
Assistant Examiner—James R. Feyrer
Attorney, Agent, or Firm—Michael, Best & Friedrich

[57] ABSTRACT

Disclosed herein is a device for introducing soil treatment liquids into the ground including a plurality of injection tines having a downwardly directed tip portion and connected to a rotatable crankshaft for reciprocative movement between a raised or non-injection position and an injection position wherein the tine portion is located beneath the ground surface. Flow of the treatment liquid to the tines is controlled by a rotary flow distribution valve which is connected directly to a chain drive sprocket mounted on the crankshaft and which is arranged to selectively supply the treatment liquid to the tines only when they are in the injection position. Each tine has a generally spherical tip made from a high aluminum ceramic material and an internal check valve located near the tip for minimizing the amount of residual liquid which can be shaken from the tine while it is in the non-injection position.

10 Claims, 7 Drawing Figures

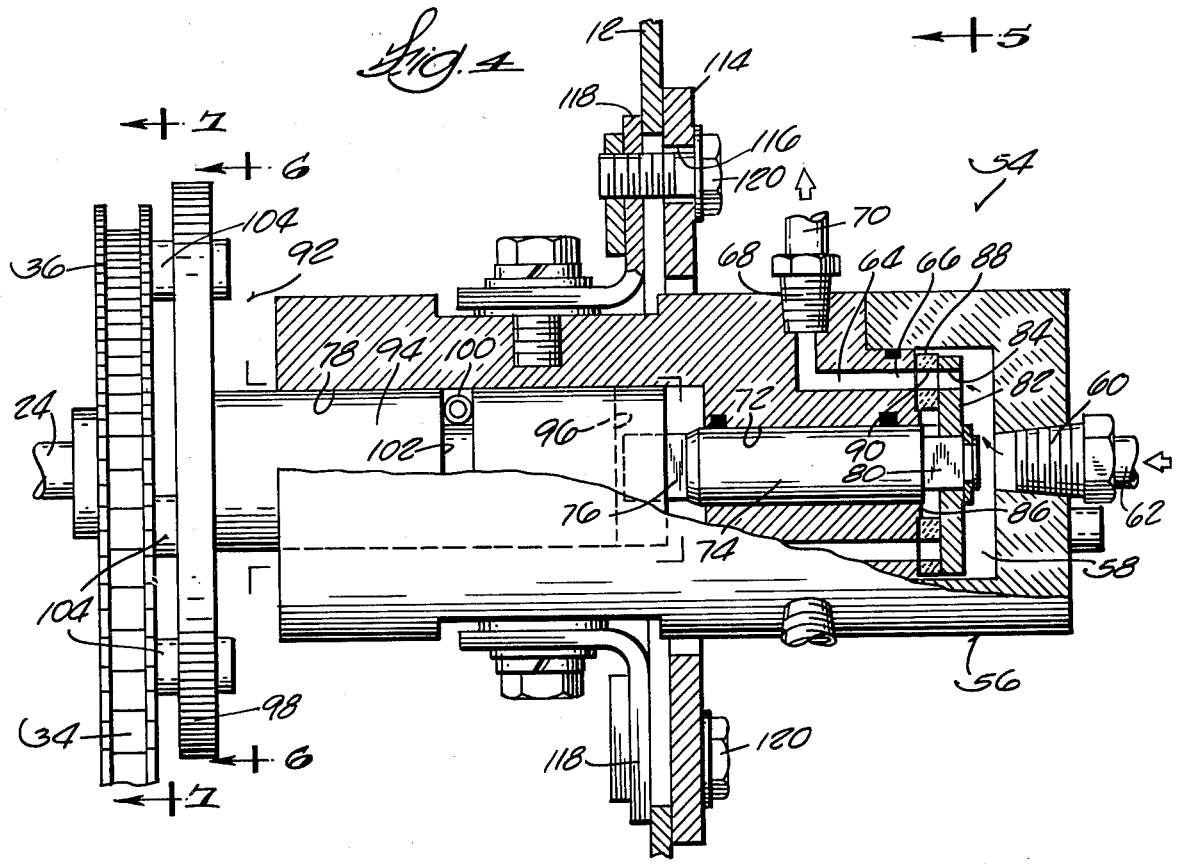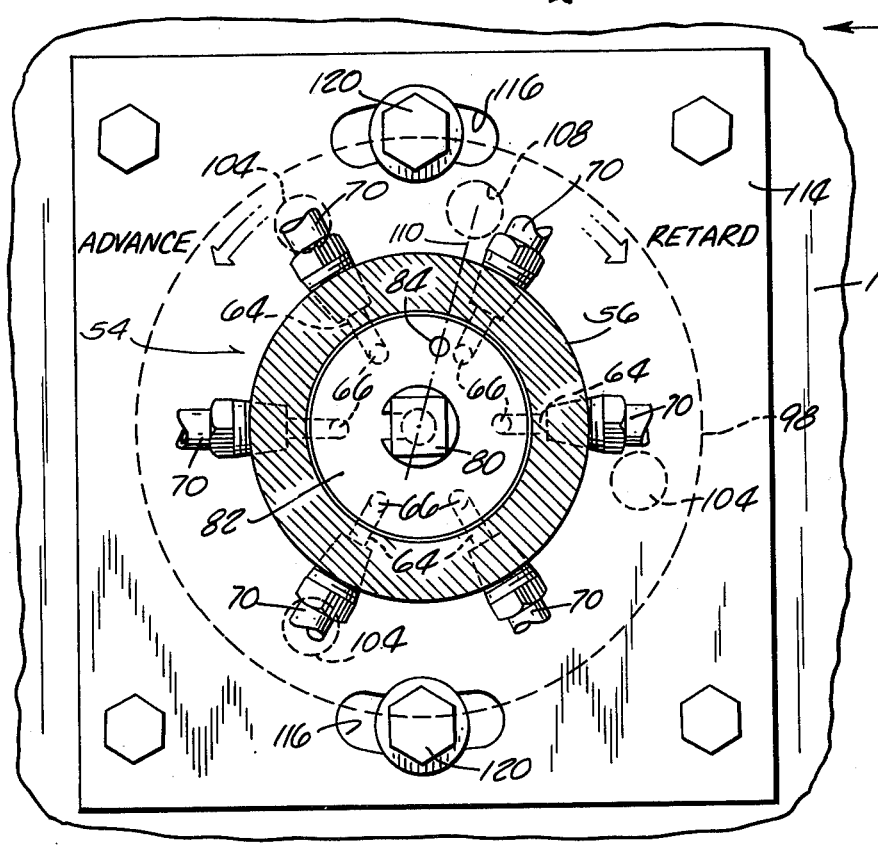

SOIL TREATMENT LIQUID INJECTION DEVICE

BACKGROUND OF THE INVENTION

The invention relates to devices for injecting soil treatment liquids into the ground and, more particularly, to such devices including a plurality of reciprocative injection tines having a ground-penetrating tip portion and means for selectively supplying the treatment liquid to the tines only when the tip portions are beneath the ground surface.

The Collins U.S. Pat. Nos. 3,926,131, issued Dec. 16, 1975, and 4,034,686, issued July 12, 1977, disclose injection devices of this type including a crankshaft reciprocating the injection tine and a flow distribution valve connected in timed relation to the crankshaft, via the crankshaft drive chain, for selectively and sequentially supplying the treatment liquid to the tines only when the tip portions are located beneath the ground surface. With this arrangement, setting the timing often can require a laborious trial and error procedure. Also, any slippage of the drive chain during operation can cause the valve to operate out of time in which case the treatment liquid is injected near or on the ground surface rather than at the desired depth beneath the ground surface.

Some prior art constructions for the injection tines include some sort of valve for preventing the flow of treatment liquid from the tines when they are in the raised or non-injection position above the ground surface. However, such valves usually are situated in the flow passage at a location wherein some quantity of the treatment liquid remains in the tines and this residual liquid tends to be shaken out onto the ground during rapid cycling of the tines. Also, the tines used in prior art devices typically employ pointed metal tips which tend to be abraded away after a few operations in some types of soil.

In addition to the above-identified Collins patents, attention is directed to the references referred to therein for examples of prior art constructions for the general type of soil treatment liquid injection devices to which the present invention relates.

SUMMARY OF THE INVENTION

The invention provides a device for introducing soil treatment liquids into the ground, which device includes a frame supported for movement along the ground surface, a plurality of injection tines which have a tip portion, have a flow passage and are connected to a crankshaft driven by a power source supported on the frame for reciprocative movement between a raised or non-injection position and an injection position wherein the tip portion is located beneath the ground surface, and a rotary flow distribution valve for selectively supplying the treatment liquid to the tines including a valve chamber, an inlet port communicating with the valve chamber and adapted for connection in communication with a supply of the treatment liquid, a plurality of outlet ports communicating with the valve chamber, and a rotatable drive shaft carrying a valve disc interposed the valve chamber and the inlets of the valve outlet ports. The valve disc has an opening which is registerable with the inlets of the valve outlet ports and which, in response to rotation of the valve drive shaft, is sequentially moved into and out of registration with the inlet of each valve outlet port. The valve shaft is drivingly connected directly to a drive member mounted on a crankshaft such that the valve disc is rotated in direct timed relation with the crankshaft to thereby supply the treatment liquid to each tine flow passage only when the respective tine is in the injection position.

In one embodiment, a pair of the tines are mounted for joint reciprocation and separate conduit means are provided for connecting the outlet of each valve outlet port with a respective pair of the tines.

In another embodiment, the valve drive shaft is coaxial with the crankshaft and the flow distribution valve includes a rotatable member mounted on the outer end of the valve driveshaft and carrying a plurality of circumferentially spaced, axially extending drive pins which are drivingly received in complementary apertures provided in the crankshaft drive member.

In a further embodiment, the flow distribution valve is adjustably mounted so that the rotational relationship of the inlets of the valve outlet ports to the crankshaft can be adjusted to advance or retard the timing for initiating the introduction of treatment liquid into the tine flow passages.

In a still further embodiment, the tine tips are made from a high aluminum ceramic material to minimize abrading thereof by the soil.

In yet a further embodiment, an integral check valve means is provided in each tine flow passage above and near the injection port for permitting flow through the flow passage when the fluid pressure in the tine flow passage is above a predetermined level and for preventing flow through the flow passage when the fluid pressure and the tine flow passage is below the predetermined level.

One of the principal features of the invention is the provision of a soil treatment liquid injection device of the type including a plurality of reciprocating, ground-penetrating injection tines driven by a rotatable crankshaft and a rotary flow distribution valve for selectively supplying a treatment liquid to the tines, which device includes means for conveniently setting and adjusting the timing of the valve relative to crankshaft rotation.

Another of the principal features of the invention is the provision of such a device including means for drivingly connecting the valve drive shaft directly to the crankshaft.

A further of the principal features of the invention is the provision of an injection tine for a soil treatment liquid injection device, which tine includes an integral check valve means arranged to minimize the amount of residual treatment liquid which can be shaken onto the ground while the tine is in a raised or non-injection position.

A still further of the principal features of the invention is the provision of an injector tine for a soil treatment liquid injection device which tine includes a tip resistant to being abraded away by the soil during penetration.

Other features, advantages, and aspects of the invention will become apparent to those skilled in the art upon reviewing the following detailed description, the drawings and the appended claims.

DESCRIPTION OF THE DRAWINGS

FIG. 4 is an enlarged, partially sectioned, side elevational view of the flow distribution valve incorporated in the device shown in FIG. 1.

FIG. 5 is a view taken generally along line 5—5 in FIG. 4.

Figure 1:
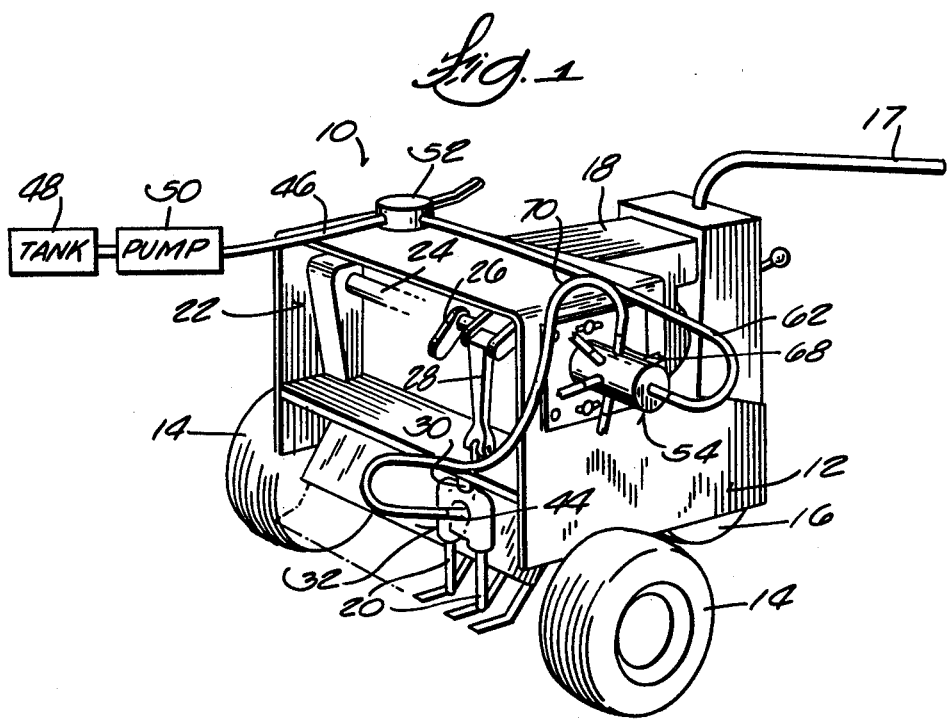
FIG. 1 is a perspective view of a soil treatment liquid injection device embodying various of the features of the invention with a separate supply of treatment liquid

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also, it is to be understood that the phraseology and terminology employed herein is for the purposes of description and should not be regarded as limiting.

DESCRIPTION OF THE PREFERRED EMBODIMENTS

Illustrated in the drawings is a soil treatment liquid injection device 10 including a frame, designated generally by reference numeral 12, supported on a pair of transversely-spaced, ground-engaging rear wheels 14 and a pair of ground-engaging front wheels 16 (one shown) rotatably mounted on a front axle assembly (not shown) which is mounted on the front portion of the frame 12 for rotation about a vertical turning axis. The device 10 can be guided for travel over the ground by a handle 17 suitably connected to the front axle assembly. Supported on the frame 12 is a prime mover, such as an internal combustion engine 18, which drives the rear wheels 14 through a suitable clutch and transmission means to propel the device 10 along the surface to be treated, such as a golf course green.

The engine 18 also drives a plurality of laterally spaced, generally cylindrical, ground-penetrating tines 20 (two shown), each including a downwardly directed tip portion 21. Extending upwardly from the rear portion of the frame 12 is a frame structure 22. Suitably journaled on the frame structure 22 is a transverse crankshaft 24 including a plurality of offset crank arms 26 (two shown). A connecting rod 28 (one shown) is pivotally connected, at the upper end, to a crank pin extending between the two illustrated crank arms 26. The lower end of each connecting rod 28 is pivotally connected to the upper end of a respective push rod 30 (one shown) slidably mounted on the frame 12. Fixedly mounted on the lower end of each push rod 30 is a dual tine injector unit 32 (one shown) including a housing or body 33 carrying a pair of the tines 20.

The engine 18 rotates the crankshaft 28 through the clutch and transmission means which includes (FIG. 4) an endless drive chain 34 trained over a first drive member or sprocket 36 mounted on one end of the crankshaft 24. Thus, as the device 10 is propelled over the surface being treated and the crankshaft 24 is rotated, pairs of the tines 20 are jointly reciprocated in a generally vertical direction between a raised position wherein the tine tip portions 21 are located above the ground surface and a lowered or injection position wherein the tine tip portions 21 are located beneath the ground surface.

Figure 3:
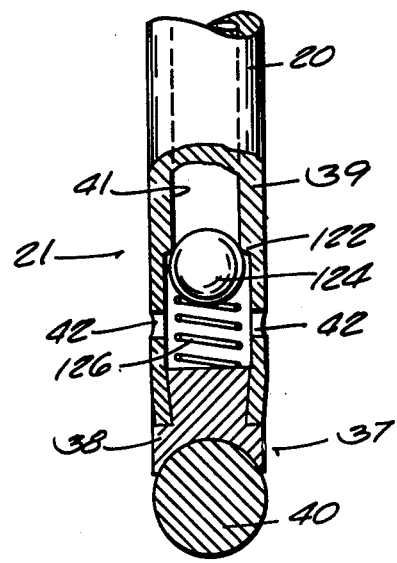
FIG. 3 is an enlarged, fragmentary, and partially sectioned view of the tip portion of one tine in the injection unit shown in FIG. 2.

As mentioned above, the tine tips of prior art constructions often tend to be abraded away within a relatively short time by certain types of soil. This shortcoming is minimized by providing each of the tines (FIG. 3) with a tip assembly 37 including an adapter 38 which is staked or otherwise suitably attached to the tine body 39 and a generally spherical tip 40 made from a high alumina ceramic material and bonded to the adapter 38 by a suitable adhesive or the like.

Figure 2:
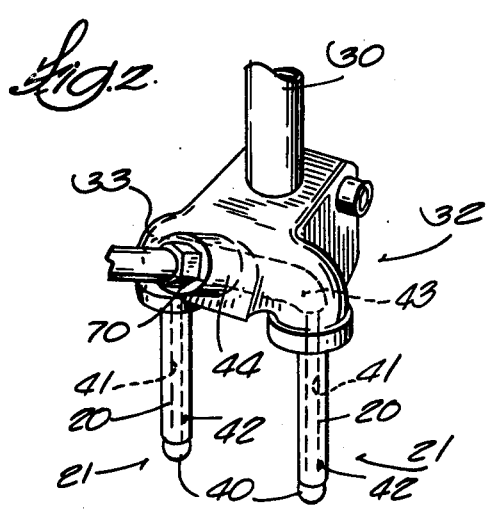
FIG. 2 is an enlarged, fragmentary perspective view of a dual tine injection unit incorporated in the device shown in FIG. 1.

Each injection tine 20 has an axially extending bore or flow passage 41 and a plurality (e.g., 4) of circumferentially spaced, radially directed injection ports 42 communicating with the flow passage 41. The injector unit body 33 (FIG. 2) is provided with a passageway 43 which communicates with the flow passages 41 of both the tines 20 of each injector unit 32. A soil treatment liquid, such as liquid containing one or more pH conditioning agents, fertilizers, compaction conditioning agents, nematacides, insecticides, fungicides, herbacides and the like, is introduced into the passageway 43 via a centrally bored inlet boss 44 on the injector unit body 33 for ultimate injection into the soil through the injection ports 42 of the respective pairs of tines 20. While various arrangements can be used, in the specific construction illustrated, the treatment liquid is supplied under pressure to the device 10 through a flexible supply conduit 46 connected to a separate supply, such as a tank wagon 48 having an on-board compressor or pump 50 (both schematically illustrated in FIG. 1). Flow of the treatment liquid from the supply to the device 10 is controlled by an on-off supply valve 52 connected in the supply conduit 46 and mounted on the frame 12.

Flow of treatment liquid to each of the injector units 32 is controlled by a rotary flow distribution valve 54 supported on the frame 12. The flow distribution valve 54 (FIGS. 4 and 5) includes a generally cylindrical housing 56 defining a valve chamber 58 having a circular cross section, an inlet port 60 communicating with the valve chamber 58 and connected to the downstream side of the supply valve 52 via an inlet conduit 62, and a plurality of circumferentially-spaced outlet ports 64 corresponding in number to the number (e.g., 6) of injector units 32. Each of the outlet ports 64 has an inlet 66 communicating with the valve chamber 58 and an outlet 68 which is connected to a respective injector unit inlet boss 44 via a separate conduit 70 (one fully illustrated in FIG. 1).

Rotatably mounted in a first central bore 72 provided in the valve housing 56 is a drive shaft or pin 74 having a flattened outer end portion 76 extending into a larger diameter second central bore 78 provided in the valve housing 56 and an inner end portion 80 extending into the valve chamber 58. Mounted on the inner end portion 80 of the drive pin 74 for common rotation therewith is a circular valve member or disc 82 having a single opening 84 which is registerable with each inlet 66 of the outlet ports 64 and which, in response to rotation of the drive pin 74, sequentially and momentarily connects each outlet port 64 in communication with the valve chamber 58.

As best shown in FIG. 4, the valve housing 56 has a generally flat interior surface 86 which faces the valve chamber 58 and in which the inlets 66 of the valve outlet ports 64 are located. Interposed the surface 86 and the valve disc 82 and suitably bonded to the surface 86 is an annular wear plate 88 including a plurality of openings 90 which are aligned with respective inlets 66 of the valve outlet ports 64 and is wipingly engaged by the rotating valve disc 82 to minimize leakage of treatment liquid past the valve disc 82. The wear plate 88 preferably is constructed from a high alumina ceramic material in order to prolong its effective life, particularly when treatment liquids containing abrasive substances are being used.

The valve disc drive pin 74 is rotated by a drive shaft assembly 92 including a shaft 94 which is rotatably mounted in and extends through the larger diameter second bore 88 in the valve housing 56 coaxially with the valve drive pin 74 and coaxially with the crankshaft 24. The drive shaft assembly 92 also includes a slotted opening 96 in the inner end of the shaft 94 receiving the flattened outer end portion 76 of the valve disc drive pin 74 and a radially extending, circular second drive member or flange 98 on the outer end of the shaft 94. A roll pin 100 extending through the valve housing 56 and tangentially to the shaft 94 within an annular recess 102 in the shaft 94 retains the drive shaft assembly 92 against axial movement relative to the valve housing 56.

Mounted on the flange 98 is a plurality (e.g., 3) of circumferentially-spaced drive pins 104 which project axially outwardly therefrom and are drivingly received in complementary apertures 106 provided in the drive chain sprocket 34. Thus, the valve disc 82 is rotated directly from the drive chain sprocket 36 in timed relation with the crankshaft 24 and the valve disc opening 84 sequentially and momentarily registers with each of the outlet port inlets 66. Pressurized soil treatment liquid which flows into the valve chamber 58 through the inlet port 60, passes through the valve disc opening 84 into the valve outlet port 64 with which it is in registration, flows through a respective conduit 70 to the respective injection unit 32, and ultimately is injected into the soil through the injection ports 42 in the respective pair of tines 20.

Figure 6:
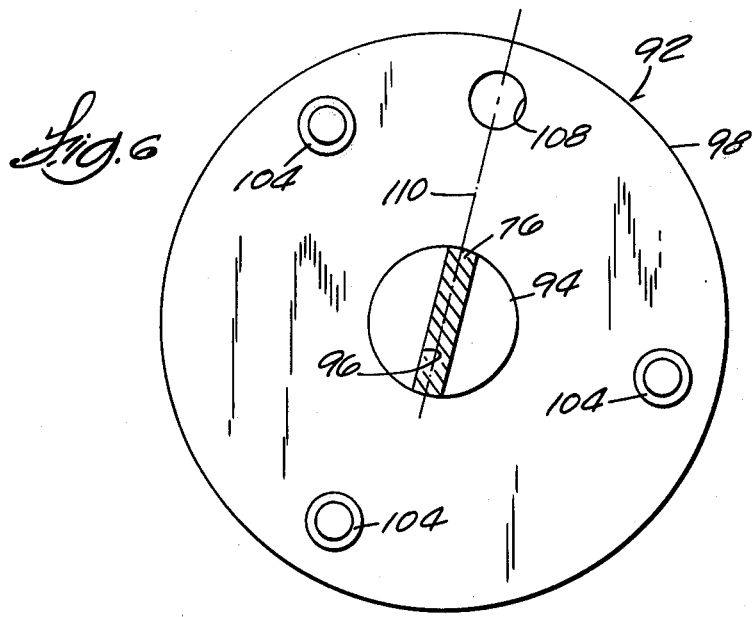
FIG. 6 is a view taken generally along line 6—6 in FIG. 4.

The drive chain sprocket 36 and the drive shaft assembly 92 are arranged so that the desired timing of the valve disc 82 relative to the crankshaft rotation, i.e., the treatment liquid is supplied to each pair of the tines 20 only when they are in the injection position, can be obtained by simply inserting the drive pins 104 into the sprocket apertures 106. More specifically (FIGS. 5 and 6), an index mark, such as a drill spot 108, is provided on the inner face of the drive shaft assembly flange 98 at a circumferential location corresponding to the desired rotational position of the valve disc opening 84 when the crankshaft 24 is at a predetermined rotational position, e.g., at a location where the illustrated injection unit 32 is about to start its downward stroke. In the specific construction illustrated (FIG. 4), the center of the drill spot 108 is located on a radial plane 110 extending through the center of the shaft 94 and the centerline of the slotted opening 96 in the inner end of the shaft 94. During assembly, the valve disc is positioned on the inner end 80 of the valve disc drive pin 74 so that the center of the opening 84 is located on the radial plane 110.

Figure 7:
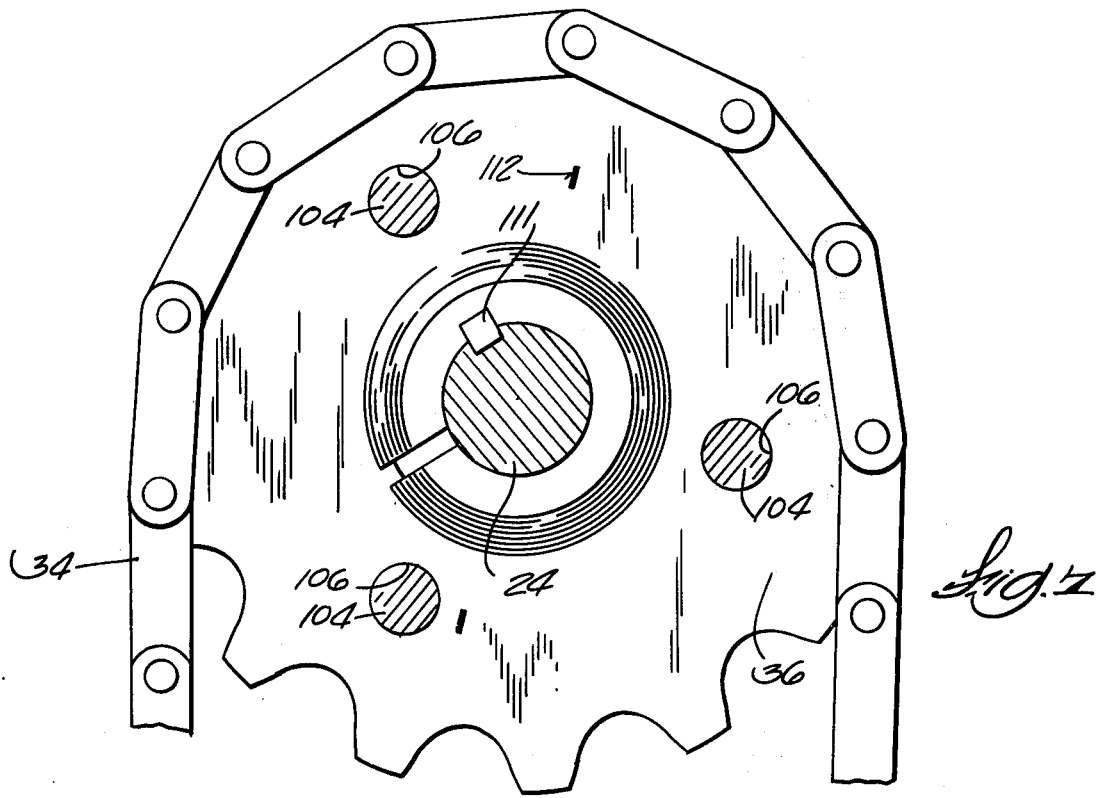
FIG. 7 is a view taken generally along line 7—7 in FIG. 4.

The chain drive sprocket 36 (FIG. 7) is mounted on the crankshaft 24 with a key 111 which is located at a predetermined rotational position of the crankshaft 24 relative to position of the tines 20. The sprocket 36 is provided with a timing mark 112 with which the drill spot 108 on the drive shaft assembly flange 98 is aligned to obtain the desired timing of the valve disc 82 relative to the rotation of the crankshaft 24. In order to assure that the drive shaft assembly flange 98 and the sprocket 36 are connected together at the desired rotational orientation, the drive pins 104 and the sprocket apertures 106 are circumferentially spaced apart at different intervals with the corresponding drive pin and apertures being spaced respectively from the drill spot 108 and the timing mark 112 at the same angular intervals. For instance, in the specific construction illustrated (FIG. 6), the drive pin 100 adjacent the drill spot 108 is located 45° (in the counterclockwise direction) from the drill spot and 120° from the next drive pin 100 (in the counterclockwise direction) which is located 105° from the next drive pin 100 (in the counterclockwise direction) which in turn is located 90° from the drill spot 108 (in the clockwise direction). The apertures 106 and the sprocket 36 are located at this same angular relationship to each other and to the timing mark 112.

The flow distribution valve 54 preferably is adjustably mounted on the frame 12 so that the valve housing 56 can be rotated, either clockwise or counterclockwise, relative to the crankshaft axis for conveniently retarding or advancing the initiation of injection through each pair of tines 20. In the specific construction illustrated (FIGS. 4 and 5), a panel 114 including a pair of diametrically opposed arcuate slots 116 is mounted on the frame 12. A pair of mounting brackets 118 are mounted on the valve housing 56 in diametrically opposed relationship and the flow distribution valve 54 is supported on the panel 114 by a pair of mounting bolts 120, each extending through a respective panel slot 116 and threaded into the respective mounting bracket 118. The initiation of injection can be retarded or advanced by loosening the mounting bolts 120, rotating the valve housing 56, either clockwise (retard) or counterclockwise (advance), to adjust the rotational relationship of the inlets 66 of the valve outlet ports 64 to the valve disc opening 84, and thus, to the crankshaft axis. After the desired timing adjustment has been made, the mounting bolts 120 are tightened.

As mentioned above, treatment liquid retained in the tines 20 tends to be shaken out through the injection ports 42 onto the ground as the tines 20 are reciprocated. Check valve means is provided in the tip portion 21 of each tine 20 near the injection ports 42 to minimize the amount of treatment liquid which can be shaken out of the tines when they are in the raised or non-injection position. More specifically, (FIG. 3), the flow passage 41 of each tine 20 is provided with an annular, downwardly facing valve seat 122 which is located a small distance above the injection ports 42. Disposed in the flow passage 41 between the valve seat 122 and the adapter 38 is a nylon ball valve 124 which is urged into sealing engagement with the valve seat 122 by a spring 126 bearing against the interior surface of the adapter 38. The ball valve 124 moves away from the valve seat 122 to permit flow of treatment liquid through the injection ports 42 when the fluid pressure in the flow passage 41 is above a predetermined level (i.e., when the treatment liquid supply is connected in communication with the respective injector unit inlet boss 44 through the flow distribution valve 54) and closes to prevent flow through the injection ports 42 when the fluid pressure in the passage 41 is below a predetermined value (i.e., when communication between the respective injector unit inlet boss 44 and the treatment liquid supply is interrupted by the flow distribution valve 54). With this arrangement, the maximum amount of residual treatment liquid which can be shaken onto the ground corresponds in volume to the internal volume between the valve seat 122 and the adapter 38 unoccupied by the ball valve 124 and the spring 126.

Various of the features of the invention are set forth in the following claims.

What is claimed is:

1. A device for introducing soil treatment liquids into the ground, which device comprises a frame, a power source supported by said frame, means supporting said frame for movement along the ground, a plurality of injection tines each including a downwardly directed tip portion and mounted for reciprocative movement between a raised position wherein said tip portion is located above the ground surface and an injection position wherein said tip portion is located beneath the ground surface, each of said tines further including a flow passage, at least one injection port in said tip portion communicating with said flow passage for dispensing the treatment liquid into the soil when said tine is located beneath the ground surface, said tip portion having an outermost tip made from a high alumina ceramic material and located below and adjacent to said injection port, said outermost tip having a generally spherical shape, a plurality of conduit means each connecting selected of said tine flow passages in communication with a pressurized supply of treatment liquid, drive means drivingly connecting said power source with said tines for reciprocating said tines between the raised and injection positions, and means for selectively controlling the flow of treatment liquid from the supply to each of said tine flow passages so that treatment liquid is supplied at a predetermined pressure to each of said tine flow passages only when the respective tine is in the injection position.

2. A device for introducing soil treatment liquids into the ground, which device comprises a frame, a power source supported by said frame, means supporting said frame for movement along the ground surface, a plurality of injection tines each including a downwardly directed tip portion and mounted for reciprocative movement between a raised position wherein said tip portion is located above the ground surface and an injection position wherein said tip portion is located beneath the ground surface, each tine further including a flow passage and at least one injection port in said tip portion communicating with said flow passage for dispensing the treatment liquid into the soil, each of said tine tip portions also including an outermost tip with said injection port being located above and adjacent said outermost tip, said outermost tip being made from a high alumina ceramic material, said outermost tip having a generally spherical shape, a crankshaft rotatably mounted on said frame, means connecting said crankshaft of said tines for reciprocating said tines between the raised and injection positions in response to rotation of said crankshaft, a first drive member mounted on said crankshaft, means drivingly connecting said power source to said first drive member for rotating said crankshaft, a rotary flow distribution valve supported by said frame and including a housing defining a valve chamber, an inlet port in said valve housing communicating with said valve chamber and adapted for connection in communication with a supply of the treatment liquid, a plurality of outlet ports in said housing each having an inlet communicating with said valve chamber and an outlet, a valve drive shaft rotatably mounted in said housing and having inner and outer ends, and a valve disc drivingly connected to the inner end of said drive shaft and interposed said valve chamber and the inlets of said valve outlet ports, said valve disc having an opening which communicates with said valve chamber, which is registerable with the inlets of said valve outlet ports, and which, in response to rotation of said valve drive shaft, is sequentially moved into and out of registration with the inlet of each of said valve outlet ports, conduit means connecting the outlet of each of said valve outlet ports in communication with selected of said tine flow passages, and a second drive member drivingly connected to the outer end of said valve drive shaft and drivingly connected directly to said first drive member such that said valve disc is rotated in direct timed relation with said crankshaft to thereby supply the treatment liquid through each of said tine flow passages only when the respective tine is in the injection position.

3. A device for introducing soil treatment liquids into the ground, which device comprises a frame having spaced side walls with one of said side walls including therein an aperture, a power source supported by said frame, means supporting said frame for movement along the ground surface, a plurality of injection tines each including a downwardly directed tip portion and mounted for reciprocative movement between a raised position wherein said tip portion is located above the ground surface and an injection position wherein said tip portion is located beneath the ground surface, each tine further including a flow passage and at least one injection port in said tip portion communicating with said flow passage for dispensing the treatment liquid into the soil, a crankshaft rotatably mounted in generally horizontal disposition on said frame and between said side walls in alignment with said aperture in said one side wall, means connecting said crankshaft to said tines for reciprocating said tines between the raised and injected positions in response to rotation of said crankshaft, a first drive member mounted on said crankshaft, means drivingly connecting said power source to said first drive member for rotating said crankshaft, a rotary flow distribution valve including a housing supported by said one side wall housing and extending in part in said aperture and defining a valve chamber, an inlet port in said valve housing communicating with said valve chamber and adapted for connection in communication with a supply of the treatment liquid, a plurality of outlet ports in said housing each having an inlet communicating with said valve chamber and an outlet, a valve drive shaft rotatably mounted in said housing coaxially with said crankshaft and having inner and outer ends, and a valve disc drivingly connected to the inner end of said drive shaft and interposed said valve chamber and said inlets of said valve outlet ports, said valve disc having an opening which communicates with said valve chamber, which is registerable with said inlets of said valve outlet ports, and which, in response to rotation of said valve drive shaft, is sequentially moved into and out of registration with said inlet of each of said valve outlet ports, conduit means connecting said outlet of each of said valve outlet ports in communication with selected of said tine flow passages, and a second drive member drivingly connected to the outer end of said valve drive shaft and drivingly connected directly to said first drive member such that said valve disc is rotated in direct timed relation with said crankshaft to thereby supply the treatment liquid through each of said tine flow passages only when the respective tine is in the injection position.

4. A device according to claim 1 wherein a pair of said tines is mounted for joint reciprocation and wherein each of said conduit means connects the outlet of one of said valve outlet ports in communication with the flow passages of both tines of a respective pair of said tines.

5. A device according to claim 1 wherein said second drive member includes a radially extending flange mounted exteriorly of said housing and carrying a plurality of circumferentially spaced, axially projecting drive pins, and wherein said first drive member comprises a rotatable member fixedly mounted on said crankshaft and drivingly connected to said power source for rotation thereby, said rotatable member having a plurality of circumferentially-spaced apertures drivingly receiving said drive pins.

6. A device according to claim 5 wherein said rotatable member comprises a sprocket driven by a chain drivingly connected to said power source.

7. A device according to claim 5 including means for adjustably mounting said flow distribution valve on said frame whereby the rotational relationship of the inlets of said valve outlet ports to said rotatable member can be adjusted to advance or retard the timing for initiating the introduction of the treatment liquid into said tine flow passages.

8. A device according to claim 3 wherein each of said tine tip portions includes an outermost tip with said injection port being located above and adjacent said outermost tip, and check valve means located in said flow passage above and near said injection port for permitting flow through said flow passage when the fluid pressure in said flow passage is above a predetermined level and for preventing flow through said flow passage when the fluid pressure in said flow passage is below said predetermined level.

9. A device according to claim 8 wherein said check valve means includes means defining a valve seat in said flow passage, a ball valve disposed in said flow passage between said valve seat and said injection port, and a spring biasing said ball valve toward said valve seat.

10. A device for introducing soil treatment liquids into the ground, which device comprises a frame, a power source supported by said frame, means supporting said frame for movement along the ground surface, a plurality of injection tines each including a downwardly directed tip portion and mounted for reciprocative movement between a raised position wherein said tip portion is located above the ground surface and an injection position wherein said tip portion is located beneath the ground surface, each tine further including a flow passage and at least one injection port in said tip portion communicating with said flow passage for dispensing the treatment liquid into the soil, a crankshaft rotatably mounted on said frame, means connecting said crankshaft to said tines for reciprocating said tines between the raised and injection positions in response to rotation of said crankshaft, a first drive member mounted on said crankshaft, means drivingly connecting said power source to said first drive member for rotating said crankshaft, a rotary flow distribution valve supported by said frame and comprising a housing defining a valve chamber and further including an inlet port communicating with said valve chamber and adapted for connection in communication with a supply of the treatment liquid, a plurality of outlet ports each having an inlet communicating with said valve chamber and an outlet, and an internal surface including said inlets of said valve outlet ports, a valve drive shaft rotatably mounted in said housing and having inner and outer ends, a valve disc drivingly connected to the inner end of said drive shaft and interposed said valve chamber and said inlets of said valve outlet ports, said valve disc having an opening which communicates with said valve chamber, which is registerable with the inlets of said valve outlet ports, and which, in response to rotation of said valve drive shaft, is sequentially moved into and out of registration with the inlet of each of said valve outlet ports, and an annular plate constructed from a high alumnia ceramic material interposed said surface of said valve disc and having a plurality of openings in respective registration with said inlets of said valve outlet ports, one side of said plate being bonded to said surface and the opposite side of said plate being wipingly engaged by said valve disc during rotation thereof, conduit means connecting the outlet of each of said valve outlet ports in communication with selected of said tine flow passages, and a second drive member drivingly connected to the outer end of said valve drive shaft and drivingly connected directly to said first drive member such that said valve disc is rotated in direct timed relation with said crankshaft to thereby supply the treatment liquid through each of said tine flow passages only when the respective tine is in the injection position.

* * * * *